US010196047B1

(12) United States Patent
Hansen et al.

(10) Patent No.: US 10,196,047 B1
(45) Date of Patent: Feb. 5, 2019

(54) CONTAMINATION PREVENTION OF VEHICLE CAMERAS AND SENSORS

(71) Applicant: Ford Global Technologies, LLC, Dearborn, MI (US)

(72) Inventors: Cheri Lyn Hansen, Canton, MI (US); Haron Abdel-Raziq, Dearborn, MI (US); Cynthia M. Neubecker, Westland, MI (US); Somak Datta Gupta, Novi, MI (US); Jonathan Diedrich, Carleton, MI (US); Brian Bennie, Sterling Heights, MI (US); Adil Nizam Siddiqui, Farmington Hills, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/670,691

(22) Filed: Aug. 7, 2017

(51) Int. Cl.
| G01N 21/00 | (2006.01) |
| B60S 1/48 | (2006.01) |
| G06K 9/00 | (2006.01) |
| B05B 7/00 | (2006.01) |
| B60R 11/04 | (2006.01) |
| B60R 1/00 | (2006.01) |
| B60S 1/56 | (2006.01) |

(52) U.S. Cl.
CPC ............. *B60S 1/481* (2013.01); *B05B 7/00* (2013.01); *B60R 1/00* (2013.01); *B60R 11/04* (2013.01); *B60R 2300/80* (2013.01); *B60S 1/56* (2013.01); *B60W 2420/42* (2013.01); *G06K 9/00791* (2013.01)

(58) Field of Classification Search
CPC .......... G01M 11/0207; G01M 11/0278; G01N 21/658; G01N 21/88; G01N 21/8806
USPC ...................................................... 356/239.2
See application file for complete search history.

(56) References Cited

U.S. PATENT DOCUMENTS

| 5,253,931 | A | * | 10/1993 | Koster | ................ | B60T 8/1769 |
| | | | | | | 180/197 |
| 6,782,793 | B1 | | 8/2004 | Lloyd | | |
| 8,090,537 | B2 | | 1/2012 | Nishira et al. | | |
| 8,757,551 | B2 | | 6/2014 | Margalit | | |
| 2003/0053140 | A1 | * | 3/2003 | Kakutani | ............ | H04N 1/00002 |
| | | | | | | 358/302 |
| 2006/0171704 | A1 | * | 8/2006 | Bingle | ................... | B60R 11/04 |
| | | | | | | 396/419 |
| 2008/0257988 | A1 | * | 10/2008 | Hahn | ................... | B05B 9/0426 |
| | | | | | | 239/525 |

(Continued)

FOREIGN PATENT DOCUMENTS

EP 2626268 A2 8/2013

*Primary Examiner* — Md M Rahman
(74) *Attorney, Agent, or Firm* — James P. Muraff; Neal, Gerber & Eisenberg LLP

(57) ABSTRACT

Methods and apparatus are disclosed for contamination prevention of vehicle cameras and sensors. An example vehicle includes an exterior, a camera along the exterior and including a lens, and a controller. The controller is to determine, based upon images captured by the camera, whether a contaminant is approaching the lens and identify a contaminant state upon determining the contaminant is approaching the lens. The example vehicle also includes a nozzle to spray washer fluid to prevent contamination of the lens responsive to the controller identifying that the contaminant is a liquid.

19 Claims, 6 Drawing Sheets

(56) References Cited

U.S. PATENT DOCUMENTS

| | | | |
|---|---|---|---|
| 2010/0104199 A1 | 4/2010 | Zhang et al. | |
| 2014/0060582 A1* | 3/2014 | Hartranft | B05B 1/06 |
| | | | 134/18 |
| 2014/0104426 A1 | 4/2014 | Boegel et al. | |
| 2014/0270379 A1* | 9/2014 | Snider | B60R 1/00 |
| | | | 382/104 |
| 2014/0350801 A1* | 11/2014 | Bonefas | A01D 43/087 |
| | | | 701/50 |
| 2015/0172582 A1* | 6/2015 | Kiyohara | G06K 9/00791 |
| | | | 348/322 |
| 2016/0176384 A1 | 6/2016 | Dissette et al. | |

\* cited by examiner

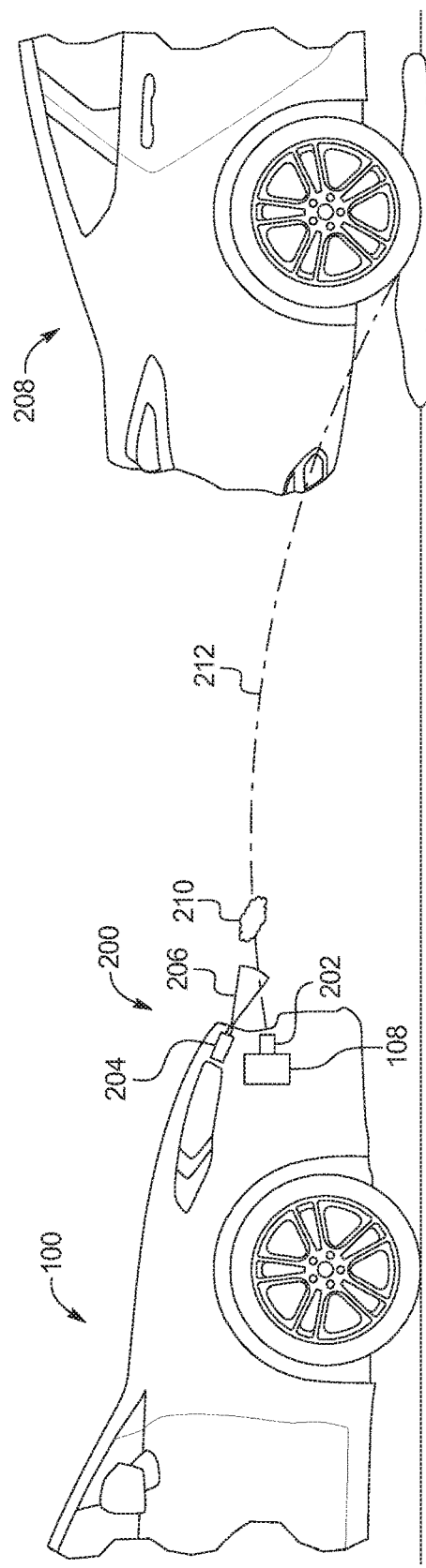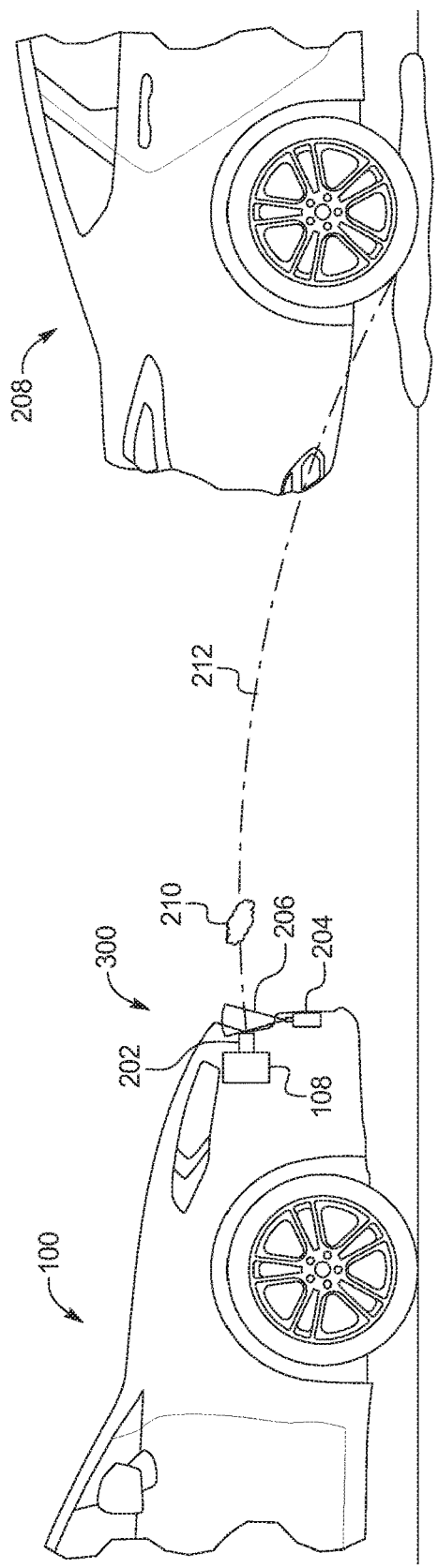

CONTAMINATION PREVENTION OF VEHICLE CAMERAS AND SENSORS

TECHNICAL FIELD

The present disclosure generally relates to cameras and sensors of vehicles and, more specifically, to contamination prevention of vehicle cameras and sensors.

BACKGROUND

Oftentimes, vehicles include cameras (e.g., digital cameras, analog cameras) that capture image(s) and/or video of a surrounding area. In some instances, the image(s) and/or video captured by the cameras are presented to a driver (e.g., via a center console display) to facilitate the driver in controlling motive functions of the vehicle. In some instances, the image(s) and/or video captured by the cameras are utilized by electronic control module(s) of the vehicle to facilitate autonomous and/or semi-autonomous motive functions performed by the vehicle. Also, vehicles oftentimes include sensors (e.g., radar sensors, lidar sensors, ultrasonic sensors) that detect and identify locations of nearby objects to facilitate electronic control module(s) in performing autonomous and/or semi-autonomous motive functions of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for contamination prevention of vehicle cameras and sensors. An example disclosed vehicle includes an exterior, a camera along the exterior and including a lens, and a controller. The controller is to determine, based upon images captured by the camera, whether a contaminant is approaching the lens and identify a contaminant state upon determining the contaminant is approaching the lens. The example disclosed vehicle also includes a nozzle to spray washer fluid to prevent contamination of the lens responsive to the controller identifying that the contaminant is a liquid.

An example disclosed method for preventing contamination of vehicle sensing devices includes capturing images via a camera positioned along an exterior of a vehicle and determining, via a processor, whether a contaminant is approaching a lens of the camera based upon the images. The example disclosed method also includes identifying, via the processor, a contaminant state upon determining the contaminant is approaching the lens and spraying fluid, via a nozzle, to prevent contamination of the lens upon identifying the contaminant is a liquid.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2 illustrates an example system for preventing contamination of a camera or sensor of the vehicle of FIG. 1.

FIG. 3 illustrates another example system for preventing contamination of an external camera or sensor of the vehicle of FIG. 1.

DETAILED DESCRIPTION OF EXAMPLE EMBODIMENTS

Figure 1:
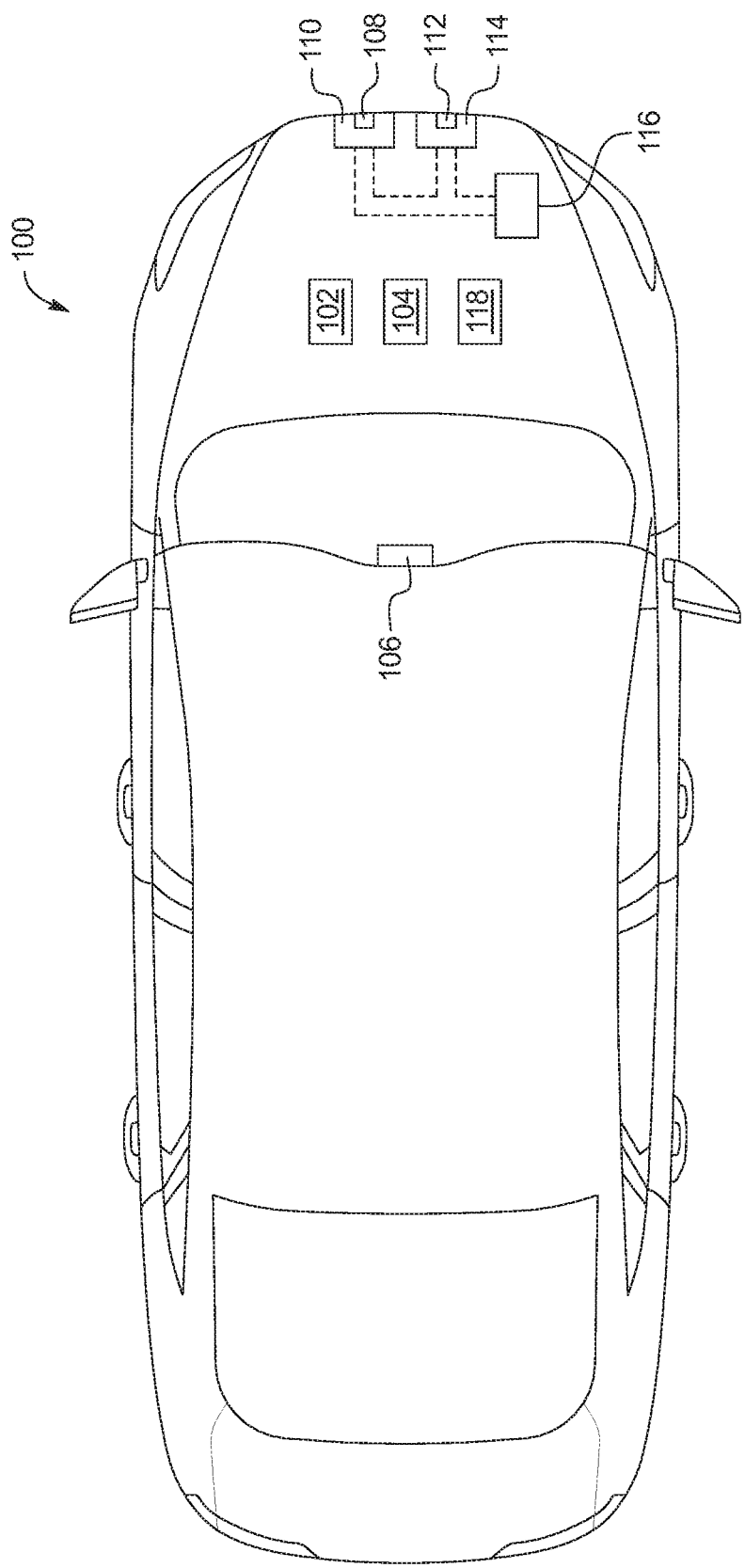
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include cameras (e.g., digital cameras, analog cameras) that capture image(s) and/or video of a surrounding area. In some instances, the image(s) and/or video captured by the cameras are presented to a driver (e.g., via a center console display) to facilitate the driver in controlling motive functions of the vehicle. In some instances, the image(s) and/or video captured by the cameras are utilized by electronic control module(s) of the vehicle to facilitate autonomous and/or semi-autonomous motive functions performed by the vehicle. Also, vehicles oftentimes include sensors (e.g., radar sensors, lidar sensors, ultrasonic sensors) that detect and identify locations of nearby objects to facilitate electronic control module(s) in performing autonomous and/or semi-autonomous motive functions of the vehicle.

During operation of the vehicle, a contaminant oftentimes contacts and adheres to a lens of a camera and/or a sensor, thereby potentially contaminating image(s) and/or video captured by the camera and/or data collected by the sensor. In some instances a nozzle of the vehicle sprays washer fluid onto the lens and/or the sensor to remove the contaminant from the lens and/or the sensor. In some instances, the nozzle may spray a large amount of washer fluid to remove the contaminant that has adhered to the lens of the camera and/or the sensor. Further, in some instances, the washer fluid potentially may be unable to fully remove the contaminant that has adhered to the lens of the camera and/or the sensor.

Example methods and apparatus disclosed herein detect when a contaminant is approaching a lens of a camera and/or a sensor and perform preventative measures to prevent and/or otherwise deter the contaminant from contaminating image(s) captured by the camera and/or data collected by the sensor. As used herein, to "contaminate" a lens of a camera and/or a sensor refers to obfuscating, impairing, blocking, and/or otherwise compromise image(s) and/or video captured by the camera and/or data collected by the sensor. As used herein, a "contaminant" refers to an object, such as dirt, mud, a stone or rock, and/or any other foreign object, that contaminates a lens of a camera and/or sensor. As used herein, "contamination" refers to a state of a lens of a camera and/or a sensor being contaminated.

The preventative measures of example methods and apparatus disclosed herein reduce an amount of washer fluid that is utilized to maintain a cleanliness of the lens of the camera and/or the sensor and reduce an amount of preventative maintenance that is performed to maintain the utility the camera and/or the sensor. For example, example methods and apparatus disclosed herein include spraying a reduced amount of washer fluid in front of the lens and/or the sensor to intercept the contaminant from contacting the lens and/or the sensor, spraying a reduced amount of washer fluid onto the lens and/or the sensor before the contaminant contacts the lens and/or the sensor to prevent the contaminant from adhering to the lens and/or the sensor, actuating a protective shield to cover the lens and/or sensor, and/or adjusting a speed of the vehicle to affect a trajectory of the contaminant relative to the vehicle.

Examples disclosed herein include a system for preventing a camera and/or a sensor positioned along an exterior of a vehicle from being affected by a contaminant (e.g., mud, a rock, etc.). The system includes a camera that monitors an area in front of and/or otherwise adjacent to the vehicle and an image processor that determines whether a contaminant is travelling toward the camera and/or a sensor (e.g., a radar sensor, a lidar sensor, an ultrasonic sensor, etc.) adjacent to the camera. In some examples, the system also collects additional data from other sensors and/or cameras, a GPS receiver, a communication module via vehicle-to-infrastructure (V2X) and/or vehicle-to-vehicle (V2V) communication, etc. If the system detects that a contaminant is approaching the camera, the system prevents the contaminant from contaminating the camera by spraying a fluid (e.g., washer fluid, compressed air, and/or another fluid) in front of and/or onto a lens of the camera, actuating a protective shield to cover the camera, and/or adjusting a speed and/or direction of travel of the vehicle. Similarly, if the system detects that a contaminant is approaching a sensor adjacent to the camera, the system prevents the contaminant from contaminating the sensor by spraying fluid (e.g., washer fluid, compressed air, and/or another fluid) in front of and/or onto a lens of the camera, actuating a protective shield to cover the sensor, and/or adjusting a speed and/or direction of travel of the vehicle. In some examples, the system selects the protective action in response to identifying a state of the contaminant (e.g., a liquid, a solid, a mixture of a liquid and a solid).

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a communication module 102, a GPS receiver, and a display 106.

The communication module 102 enables the vehicle 100 to communicate with other vehicles (e.g., a vehicle 208 of FIGS. 2-5), infrastructure, and/or other communication modules that are nearby. For example, the communication module 102 is a dedicated short-range communication (DSCR) module that includes antenna(s), radio(s), and software to establish connections and broadcast messages between the vehicle 100 and other vehicles, infrastructure-based modules, and/or mobile device-based modules.

More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

Further, the GPS receiver 104 of the illustrated example that is utilized to identify a location of the vehicle 100. For example, the GPS receiver 104 receives a signal from a global positioning system (GPS) to determine the location and/or global position of the vehicle 100. Further, the display 106 presents image(s) and/or video to occupant(s) of the vehicle 100. For example, the display 106 presents image(s) and/or video to facilitate a driver in operating the vehicle 100 and/or to entertain occupant(s) of the vehicle 100.

The vehicle 100 of the illustrated example also includes a camera 108 that is located along an exterior of the vehicle 100 to capture image(s) and/or video of a surrounding area of the vehicle 100. In the illustrated example, the camera 108 is positioned toward the front of the vehicle 100 and captures image(s) and/or video of an area in front of and/or to the side of the vehicle 100. Additionally or alternatively, the camera 108 and/or another camera may be located at another position along the exterior of the vehicle 100 for capturing other surrounding area(s) of the vehicle 100. In some examples, the image(s) and/or video captured by the camera 108 are presented via the display 106 to facilitate a driver in operating the vehicle 100. Further, in some examples, the image(s) and/or video captured by the camera 108 utilized to facilitate performance of autonomous and/or semi-autonomous driving maneuvers of the vehicle 100.

As illustrated in FIG. 1, the vehicle 100 also includes a contaminant-prevention system 110 (e.g., a first contaminant-prevention system) that prevents and/or deters a lens of the camera 108 from being covered or otherwise contaminated by a contaminant (e.g., a contaminant 210 of FIGS. 2-5). For example, the contaminant-prevention system 110 includes a nozzle (e.g., a first nozzle, a nozzle 204 of FIGS. 2-5) that sprays fluid (e.g., washer fluid, compressed air, etc.) and/or a shield (e.g., a first shield, a shield 402 of FIG. 4) that covers the camera 108 to prevent and/or deter the lens of the camera 108 from being contaminated by a contaminant. The contaminant-prevention system 110 prevents and/or deters the lens of the camera 108 from being covered to prevent the image(s) and/or video captured by the camera 108 from including an obstructed view of the surrounding area of the vehicle 100.

In the illustrated example, the sensor 112 is located along the exterior of the vehicle 100 adjacent to the camera 108. The sensor 112 is a radar sensor (e.g., a radar sensor 616 of FIG. 6), a lidar sensor (e.g., a lidar sensor 618 of FIG. 6), an ultrasonic sensor (e.g., an ultrasonic sensor 620 of FIG. 6), and/or any other sensor that is utilized to detect and/or identify location(s) of object(s) near the vehicle 100. For example, the sensor 112 detects and/or identifies location(s) of object(s) to facilitate performance of autonomous and/or semi-autonomous driving maneuvers of the vehicle 100. In the illustrated example, the sensor 112 is positioned toward the front of the vehicle 100 to detect and identify location(s) of object(s) in front of and/or to the side of the vehicle 100. Additionally or alternatively, the sensor 112 and/or another sensor may be located at another position along the exterior of the vehicle 100 for detecting and identifying location(s) of object(s) within other surrounding area(s) of the vehicle 100.

As illustrated in FIG. 1, the vehicle 100 also includes a contaminant-prevention system 114 (e.g., a second contaminant-prevention system) that prevents and/or deters the sensor 112 from being covered and/or otherwise contaminated by a contaminant (e.g., the contaminant 210 of FIGS. 2-5). For example, the contaminant-prevention system 114 includes a nozzle (e.g., a second nozzle, the nozzle 204 of FIGS. 2-5) that sprays fluid (e.g., washer fluid, compressed air, etc.) and/or a shield (e.g., a second shield, the shield 402 of FIG. 4) that covers the sensor 112 to prevent and/or deter the sensor 112 from being contaminated by a contaminant. The contaminant-prevention system 114 prevents and/or deters the sensor 112 from being covered to prevent the sensor 112 from being obstructed in detecting and/or identifying location(s) of nearby object(s).

The vehicle 100 of the illustrated example also includes a reservoir 116 for storing the fluid (e.g., washer fluid, compressed air, etc.) that a nozzle of the contaminant-prevention system 110 and/or a nozzle of the contaminant-prevention system 114 is to spray to prevent the camera 108 and/or the sensor 112 from being obstructed, respectively.

As illustrated in FIG. 1, the vehicle 100 also includes a contaminant controller 118 that controls operation of the contaminant-prevention system 110 and/or the contaminant-prevention system 114 to prevent the camera 108 and/or the sensor 112 from being obstructed, respectively.

In operation, the contaminant controller 118 determines whether a contaminant (e.g., dirt, mud, a rock, etc.) is approaching a lens of the camera 108 and/or the sensor 112. For example, the contaminant controller 118 determines whether there is an approaching contaminant based upon the images captured by the camera 108. To determine whether there is an approaching contaminant based upon the captured images, the contaminant controller 118 identifies a percentage of each of the images that is occupied by the contaminant over time. For example, the contaminant controller 118 determines that the contaminant is on a trajectory to approach the lens of the camera 108 in response to identifying that the contaminant covers a predetermined portion (e.g., a first predetermined portion) of an image, the percentage occupied by the contaminant within the images increases to a predetermined threshold percentage (e.g., a first predetermined threshold percentage), and/or the percentage occupied by the contaminant within the images increases for a predetermined time threshold (e.g., a first predetermined time threshold). Similarly, the contaminant controller 118 determines that the contaminant is on a trajectory to approach the sensor 112 in response to identifying that the contaminant covers a predetermined portion (e.g., a second predetermined portion) of an image, the percentage occupied by the contaminant within the images increases to a predetermined threshold percentage (e.g., a second predetermined threshold percentage), and/or the percentage occupied by the contaminant within the images increases for a predetermined time threshold (e.g., a second predetermined time threshold).

Additionally or alternatively, the contaminant controller 118 determines that a contaminant is approaching the lens of the camera 108 and/or the sensor 112 based upon information collected by the communication module 102 from another vehicle (e.g., the vehicle 208 of FIG. 2 that is in front of the vehicle 100) via vehicle-to-vehicle (V2V) communication and/or from another communication module via vehicle-to-infrastructure (V2X) communication. Further, in some examples, the contaminant controller 118 determines that a contaminant is approaching the lens of the camera 108 and/or the sensor 112 based upon an onboard navigation system and a location of the vehicle 100 that is identified via the GPS receiver 104. Upon identifying that a contaminant is approaching the lens of the camera 108 and/or the sensor 112, the contaminant controller 118 determines a state (e.g., a liquid, a solid, etc.) of the contaminant.

In some examples, in response to the contaminant controller 118 determining that a liquid contaminant (e.g., mud) is approaching the lens of the camera 108, a nozzle (e.g., a first nozzle) sprays fluid (e.g., washer fluid, compressed air, etc.) in front of and/or onto the lens before the contaminant contacts the lens to prevent contamination of the lens. In other examples, in response to the contaminant controller 118 determining that a solid contaminant (e.g., a stone or rock) is approaching the lens and/or determining that a liquid contaminant is approaching the lens and a corresponding nozzle is unable to spray the fluid, a shield (e.g., a first shield) is actuated (e.g., to a closed position) to cover the lens of the camera 108 before the contaminant contacts the lens to prevent contamination of the lens.

Further, in some examples, in response to the contaminant controller 118 determining that a liquid contaminant is approaching the sensor 112, a nozzle (e.g., a second nozzle) sprays fluid (e.g., washer fluid, compressed air, etc.) in front of and/or onto the sensor 112 before the contaminant contacts the sensor 112 to prevent contamination of the sensor 112. In other examples, in response to the contaminant controller 118 determining that a solid contaminant is approaching the sensor 112 and/or determining that a liquid contaminant is approaching the sensor 112 and a corresponding nozzle is unable to spray the fluid, a shield (e.g., a second shield) is actuated (e.g., to a closed position) to cover the sensor 112 of the camera 108 before the contaminant contacts the sensor 112 to prevent contamination of the sensor 112.

Additionally or alternatively, the contaminant controller 118 sends a deceleration signal to a speed control module (e.g., a speed control unit 630 of FIG. 6) and/or an autonomy unit (e.g., an autonomy unit 632 of FIG. 6) to cause the vehicle 100 to decelerate to prevent contamination of the lens and/or the sensor 112 by altering the trajectory of the contaminant relative to the lens and the sensor 112.

FIG. 2 illustrates an example contaminant-prevention system 200 (e.g. the contaminant-prevention system 110 of FIG. 1) that is configured to prevent contamination of a lens 202 of the camera 108 of the vehicle 100. As illustrated in FIG. 2, the contaminant-prevention system 200 includes a nozzle 204 for spraying washer fluid 206. In the illustrated example, the nozzle 204 is positioned above the camera 108 along the exterior of the vehicle 100. In other examples, the nozzle 204 is positioned below and/or to the side of the camera 108 along the exterior of the vehicle 100.

The vehicle 100 of the illustrated example is travelling behind a vehicle 208, which causes a contaminant 210 to project along a trajectory 212 toward the lens 202 of the camera 108. The contaminant controller 118 of the vehicle 100 detects that the contaminant 210 is approaching the lens 202 along the trajectory 212. Further, the contaminant controller 118 of the vehicle 100 identifies that the contaminant 210 is a liquid (e.g., mud) upon determining that the contaminant 210 is approaching the lens 202. For example, the contaminant controller 118 determines that the contaminant 210 is a liquid based upon characteristics of the contaminant 210 identified within the image(s) and/or video captured by the camera 108, information collected via the communication module 102 (e.g., from the vehicle 208 that is kicking up the contaminant 210), and/or information collected from the GPS receiver 104 and an onboard navigation system.

Responsive to the contaminant controller 118 identifying that the contaminant 210 approaching the lens 202 is a liquid, the nozzle 204 of the illustrated example sprays the washer fluid 206 to prevent contamination of the lens 202 by the contaminant 210. As illustrated in FIG. 2, the nozzle 204 sprays the washer fluid 206 in front of the lens 202 to intercept the contaminant 210 and, thus, prevent the contaminant 210 from contacting the lens 202. For example, the nozzle 204 sprays the washer fluid 206 to prevent the contaminant 210 from contacting the lens 202 to reduce an amount of the washer fluid 206 that is utilized to maintain a cleanliness of the lens 202 of the camera 108.

In FIG. 2, the contaminant-prevention system 200 is configured to prevent contamination of the camera 108. In other examples, the contaminant-prevention system 200 is configured to prevent contamination of an adjacent sensor (e.g., the sensor 112 of FIG. 1) of the vehicle 100. In such examples, the contaminant controller 118 of the vehicle 100 detects that the contaminant 210 is approaching the sensor 112 and identifies that the contaminant 210 is a liquid (e.g., based upon image(s) and/or video captured by the camera 108 that is adjacent to the sensor 112, information collected via the communication module 102, information collected from the GPS receiver 104 and the onboard navigation system, etc). Responsive to the contaminant controller 118 identifying that the contaminant 210 approaching the sensor 112 is a liquid, the nozzle 204 (e.g., a second nozzle) sprays the washer fluid 206 and/or other fluid in front of the sensor 112 to intercept the contaminant 210 and, thus, prevent the contaminant 210 from contacting the sensor 112.

FIG. 3 illustrates another example contaminant-prevention system 300 (e.g. the contaminant-prevention system 110 of FIG. 1) that is configured to prevent contamination of the camera 108 of the vehicle 100. As illustrated in FIG. 3, the contaminant-prevention system 300 includes the nozzle 204. In the illustrated example, the nozzle 204 is positioned below the camera 108 along the exterior of the vehicle 100. In other examples, the nozzle 204 is positioned above and/or to the side of the camera 108 along the exterior of the vehicle 100.

In the illustrated example, the vehicle 100 is travelling behind the vehicle 208, which causes the contaminant 210 to project toward the lens 202 of the camera 108. Further, the contaminant controller 118 of the vehicle 100 detects that the contaminant 210 is approaching the lens 202 along the trajectory 212 and identifies that the contaminant 210 is a liquid (e.g., mud). Responsive to the contaminant controller 118 identifying that the contaminant 210 approaching the lens 202 is a liquid, the nozzle 204 of the illustrated example sprays the washer fluid 206 to prevent contamination of the lens 202 by the contaminant 210. As illustrated in FIG. 3, the nozzle 204 sprays the washer fluid 206 onto the lens 202 before the contaminant 210 contacts the lens 202 to lubricate an outer surface of the lens 202 and, thus, prevent and/or otherwise deter the contaminant 210 from adhering to the lens 202 of the camera 108. That is, the nozzle 204 sprays the washer fluid 206 onto the lens 202 before the contaminant 210 contacts the lens 202 to cause the contaminant 210 to slide off the outer surface of the lens 202 upon contacting the lens 202.

In some examples, the contaminant controller 118 determines whether the contaminant 210 at least partially adheres to and/or covers the lens 202 after the nozzle 204 has anticipatorily sprayed the washer fluid 206 onto the lens 202. For example, the contaminant controller 118 determines whether the lens 202 is clean based upon image(s) and/or video captured by the camera 108 after the nozzle 204 has sprayed the washer fluid 206 onto the lens 202. In response to the contaminant controller 118 determining that the contaminant 210 at least covers the lens 202, the nozzle 204 again sprays the washer fluid 206 onto the lens 202 to further clean the lens 202 by removing the contaminant 210 from the lens 202.

In FIG. 3, the contaminant-prevention system 300 is configured to prevent contamination of the camera 108. In other examples, the contaminant-prevention system 300 is configured to prevent contamination of an adjacent sensor (e.g., the sensor 112 of FIG. 1) of the vehicle 100. In such examples, the contaminant controller 118 detects that the contaminant 210 is approaching the sensor 112 and identifies that the contaminant 210 is a liquid. Responsive to the contaminant controller 118 identifying that the contaminant 210 approaching the sensor 112 is a liquid, the nozzle 204 (e.g., a second nozzle) sprays the washer fluid 206 onto an outer surface of the sensor 112 to prevent and/or otherwise deter the contaminant 210 from at least partially adhering to and/or covering the outer surface of the sensor 112.

Figure 4A:
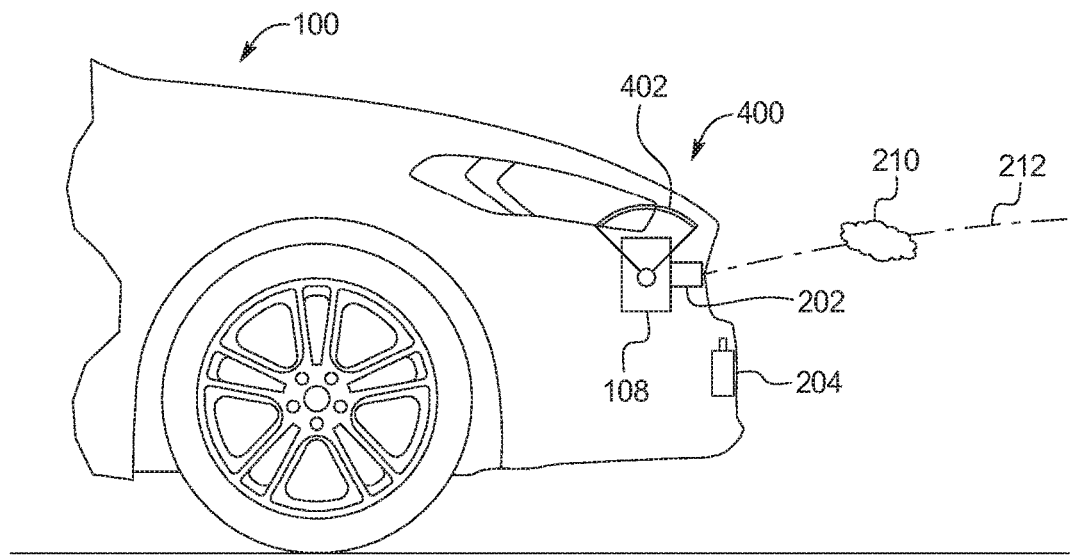
FIG. 4A illustrates another example system for preventing contamination of a camera or sensor of the vehicle of FIG. 1 in a first state.
Figure 4B:
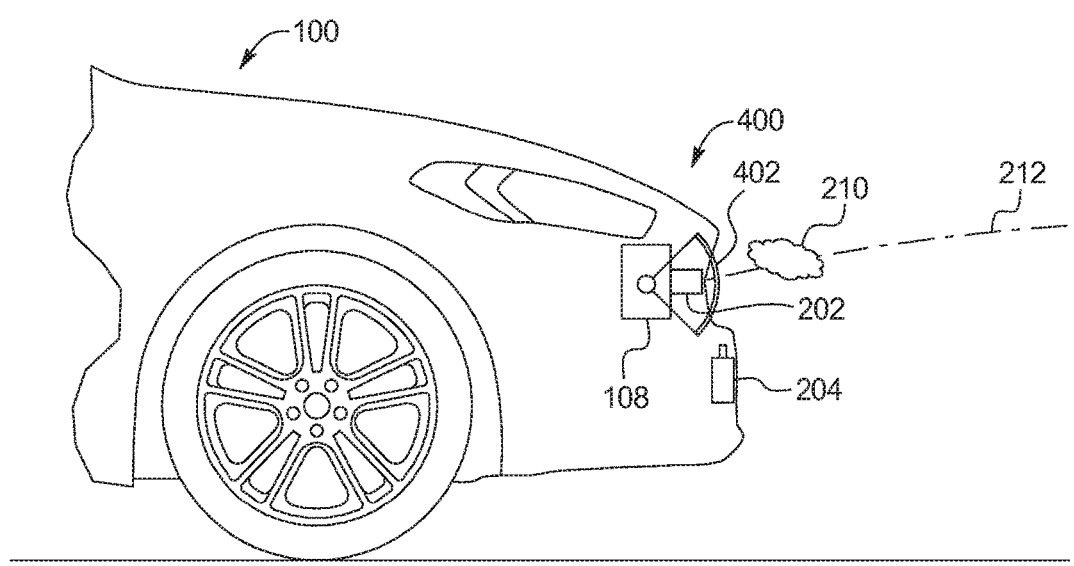
FIG. 4B illustrates the system of FIG. 4A in a second state.

FIGS. 4A-4B illustrate another example contaminant-prevention system 400 (e.g. the contaminant-prevention system 110 of FIG. 1). More specifically, FIG. 4A depicts the contaminant-prevention system 400 in a first state, and FIG. 4B depicts the contaminant-prevention system 400 in a second state. In the illustrated example, the contaminant-prevention system 400 is configured to prevent contamination of the camera 108 of the vehicle 100. In other examples, the contaminant-prevention system 400 (e.g. the contaminant-prevention system 114 of FIG. 1) is configured to prevent contamination of a sensor (e.g., the sensor 112 of FIG. 1) of the vehicle 100.

As illustrated in FIG. 4A-4B, the contaminant-prevention system 400 includes the nozzle 204 (e.g., for spraying the washer fluid 206 onto and/or in front of the lens 202). In the illustrated example, the nozzle 204 is positioned below the camera 108 along the exterior of the vehicle 100. In other examples, the nozzle 204 is positioned above and/or to the side of the camera 108 along the exterior of the vehicle 100. Further, the contaminant-prevention system 400 of the illustrated example includes a shield 402 adjacent to the camera 108 that actuates between an open position (FIG. 4A) and a closed position (FIG. 4B). For example, in the open position, the shield 402 is retracted into a slot along the exterior of the vehicle 100 and exposes the lens 202 of the camera 108 to a surrounding environment of the vehicle 100. In the closed position, the shield 402 is protracted from the slot to cover the lens 202 of the camera 108 and, thus, protect the lens 202 from the surrounding environment of the vehicle 100. In the illustrated example, the shield 402 is transparent to enable the camera 108 to capture image(s) and/or video when the shield 402 is in the closed position. In some examples, the vehicle 100 includes a brush and/or a rubber blade (e.g., a squeegee) adjacent to the slot that cleans the shield 402 as the shield 402 retracts to the open position. Additionally or alternatively, the nozzle 204 sprays the washer fluid 206 onto the shield 402 to clean the shield 402.

In the illustrated example, the contaminant controller 118 of the vehicle 100 detects that the contaminant 210 is approaching the lens 202 along the trajectory 212. Further, the contaminant controller 118 identifies that the contaminant 210 includes a solid (e.g., a stone, a rock, etc.) that potentially may damage (e.g., crack) the lens 202 of the camera 108 upon contacting the lens 202. Responsive to identifying that the contaminant 210 approaching the lens 202 is a solid, the contaminant controller 118 causes the shield 402 to actuate from the open position to the closed position to cover the lens 202 of the camera 108. In the closed position, the shield 402 prevents the contaminant 210 from contacting the lens 202.

Further, the shield 420 is to cover the lens 202 in response to the contaminant controller 118 identifying that the contaminant 210 is a liquid and that the nozzle 204 is unable to spray the washer fluid 206 to prevent contamination of the lens 202. For example, the contaminant controller 118 determines that the nozzle 204 is unable to spray the washer fluid 206 responsive to a reservoir sensor (e.g., a reservoir sensor 622 of FIG. 6) detecting the washer fluid 206 is below a predetermined threshold within the reservoir 116 and/or a pressure sensor (e.g., a pressure sensor 624 of FIG. 6) detecting that a pressure within the nozzle 204 is below a predetermined threshold.

In FIGS. 4A-4B, the contaminant-prevention system 400 is configured to prevent contamination of the camera 108. In other examples, the contaminant-prevention system 400 is configured to prevent contamination of an adjacent sensor (e.g., the sensor 112 of FIG. 1) of the vehicle 100. In such examples, the contaminant controller 118 detects that the contaminant 210 is approaching the sensor 112. Further, the contaminant controller 118 identifies that the contaminant 210 is a liquid and/or determines that the nozzle 204 is unable to sufficiently spray the washer fluid 206. In response, the shield 402 (e.g., a second shield) actuates to the closed position to prevent the contaminant 210 from contacting the sensor 112.

Figure 5:
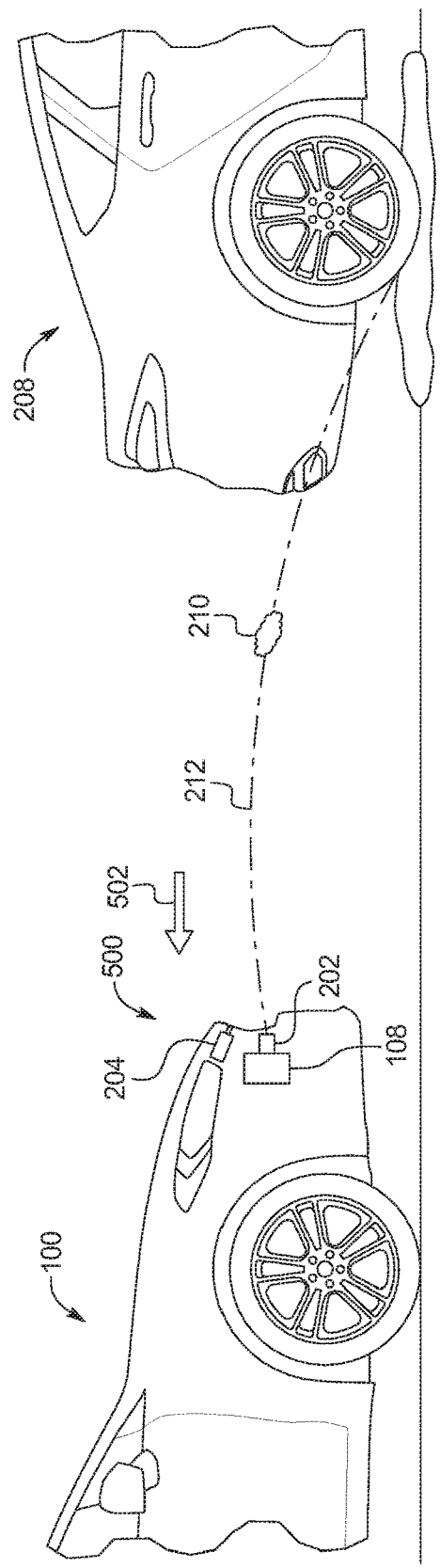
FIG. 5 illustrates another example system for preventing contamination of a camera or sensor of the vehicle of FIG. 1.

FIG. 5 illustrates another example contaminant-prevention system 500 (e.g. the contaminant-prevention system 110 of FIG. 1) that is configured to prevent contamination of the camera 108 of the vehicle 100. As illustrated in FIG. 3, the contaminant-prevention system 300 includes the nozzle 204 (e.g., for spraying the washer fluid 206 in front of and/or onto the lens 202 of the camera 108). In the illustrated example, the nozzle 204 is positioned above the camera 108 along the exterior of the vehicle 100. In other examples, the nozzle 204 is positioned below and/or to the side of the camera 108 along the exterior of the vehicle 100.

In the illustrated example, the vehicle 100 is travelling behind the vehicle 208, which causes the contaminant 210 to project toward the lens 202 of the camera 108. The contaminant controller 118 of the vehicle 100 detects that the contaminant 210 (e.g., a solid, a liquid) is approaching the lens 202 along the trajectory 212. In response to detecting that the contaminant 210 is approaching the lens 202, the contaminant controller 118 the contaminant controller 118 sends a signal to an electronic control unit of the vehicle 100 (e.g., a speed control unit 630 of FIG. 6, an autonomy unit 632 of FIG. 6) to autonomously change a speed of the vehicle 100 to prevent the contaminant 210 from contaminating the lens 202. For example, the contaminant controller 118 sends a deceleration signal or an acceleration signal to cause the vehicle 100 to autonomously decelerate (represented by an arrow 502) or accelerate, respectively. As a result, the contaminant 210 soars over the vehicle 100, contacts the ground in front of the vehicle 100, and/or contacts the vehicle 100 above or below the lens 202 of the camera 108.

In FIG. 5, the contaminant-prevention system 500 is configured to prevent contamination of the camera 108. In other examples, the contaminant-prevention system 500 is configured to prevent contamination of an adjacent sensor (e.g., the sensor 112 of FIG. 1) of the vehicle 100. In such examples, the contaminant controller 118 detects that the contaminant 210 is approaching the sensor 112 and causes the vehicle 100 to autonomously decelerate (represented by the arrow 502) and/or accelerate to prevent the contaminant 210 from contacting the sensor 112.

Figure 6:
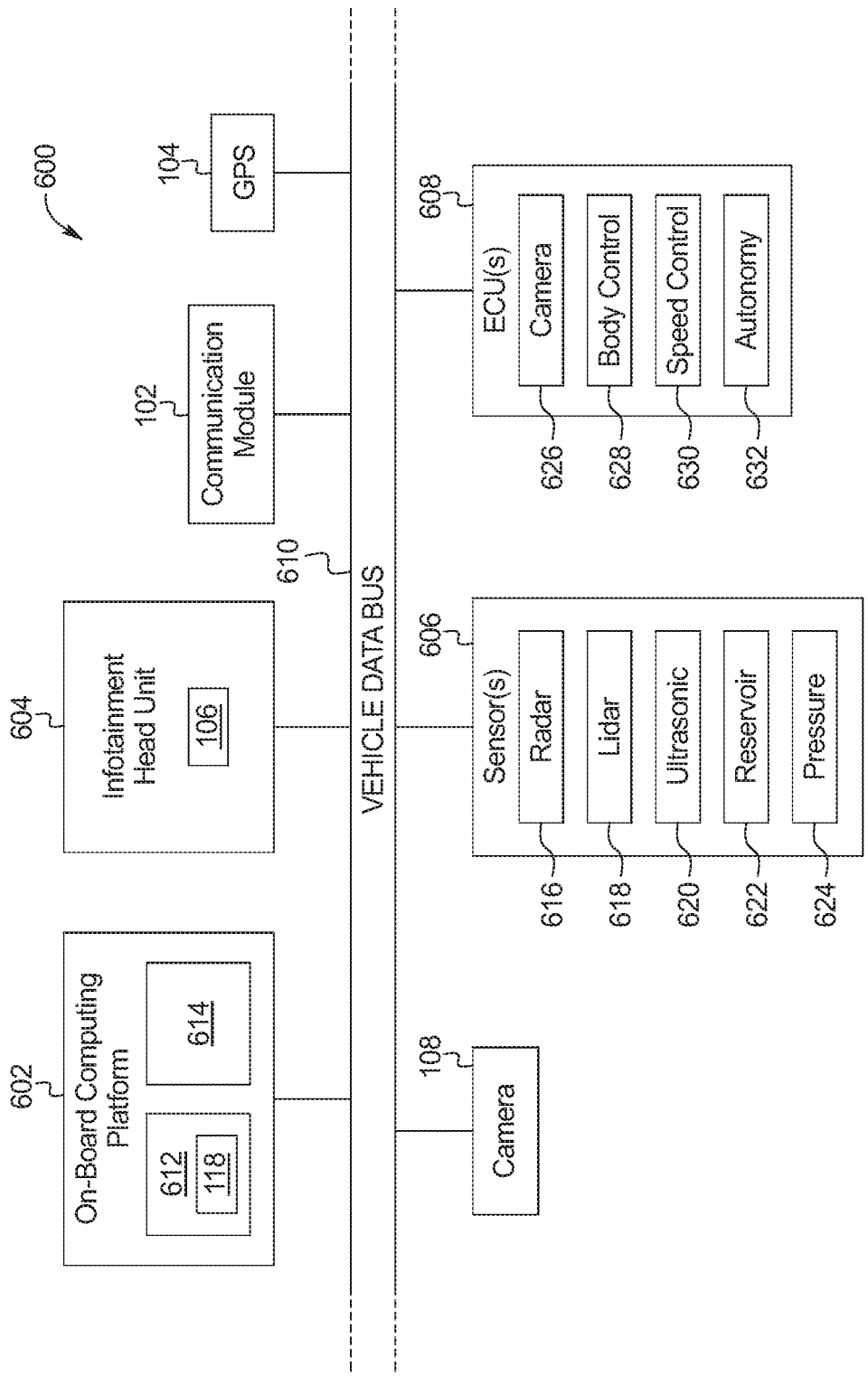
FIG. 6 is a block diagram of electronic components of the vehicle of FIG. 1.

FIG. 6 is a block diagram of electronic components 600 of the vehicle 100. In the illustrated example, the electronic components 600 include an on-board computing platform 602, an infotainment head unit 604, the communication module 102, the GPS receiver 104, the camera 108, sensors 606, electronic control units (ECUs) 608, and a vehicle data bus 610.

The on-board computing platform 602 includes a microcontroller unit, controller or processor 612 and memory 614. In some examples, the processor 612 of the on-board computing platform 602 is structured to include the contaminant controller 118. Alternatively, in some examples, the contaminant controller 118 is incorporated into another electronic control unit (ECU) with its own processor 612 and memory 614. The processor 612 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 614 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 614 includes multiple kinds of memory, particularly volatile memory and non-volatile memory.

The memory 614 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 614, the computer readable medium, and/or within the processor 612 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 604 provides an interface between the vehicle 100 and a user. The infotainment head unit 604 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the display 106 (e.g., a heads-up display, a center console display such as a liquid crystal display (LCD), an organic light emitting diode (OLED) display, a flat panel display, a solid state display, etc.), and/or speakers. In the illustrated example, the infotainment head unit 604 includes hardware (e.g., a processor or controller, memory, storage, etc.) and software (e.g., an operating system, etc.) for an infotainment system (e.g., SYNC® and MyFord Touch® by Ford®). Additionally, the infotainment head unit 604 displays the infotainment system on, for example, the display 106.

The sensors 606 are arranged in and around the vehicle 100 to monitor properties of the vehicle 100 and/or an environment in which the vehicle 100 is located. One or more of the sensors 606 may be mounted to measure properties around an exterior of the vehicle 100. Additionally or alternatively, one or more of the sensors 606 may be mounted inside a cabin of the vehicle 100 or in a body of the vehicle 100 (e.g., an engine compartment, wheel wells, etc.) to measure properties in an interior of the vehicle 100. For example, the sensors 606 include accelerometers, odometers, tachometers, pitch and yaw sensors, wheel speed sensors, microphones, tire pressure sensors, biometric sensors and/or sensors of any other suitable type.

In the illustrated example, the sensors 606 include a radar sensor 616, a lidar sensor 618, an ultrasonic sensor 620, a reservoir sensor 622, and a pressure sensor 624. For example, the radar sensor 616, the lidar sensor 618, and/or the ultrasonic sensor 620 is the sensor 112 of the vehicle 100 that detects and/or identifies location(s) of object(s) to facilitate performance of autonomous and/or semi-autonomous driving maneuvers of the vehicle 100. The radar sensor 616 detects and locates an object via radio waves, the lidar sensor 618 detects and locates the object via lasers, and the ultrasonic sensor 620 detects and locates the object via ultrasound waves. Further, the reservoir sensor 622 of the illustrated example monitors a level of the washer fluid 206 within the reservoir 116 and the pressure sensor 624 monitors a pressure within the nozzle 204 to enable the contaminant controller 118 to determine whether the nozzle 204 is unable to spray the washer fluid 206. For example, the contaminant controller 118 determines that the nozzle 204 is unable to spray the washer fluid 206 in response to the reservoir sensor 622 detecting that the reservoir level is below a predetermined threshold and/or in response to the pressure sensor 624 detecting that the pressure within the nozzle 204 is below a predetermined threshold.

The ECUs 608 monitor and control the subsystems of the vehicle 100. For example, the ECUs 608 are discrete sets of electronics that include their own circuit(s) (e.g., integrated circuits, microprocessors, memory, storage, etc.) and firmware, sensors, actuators, and/or mounting hardware. The ECUs 608 communicate and exchange information via a vehicle data bus (e.g., the vehicle data bus 610). Additionally, the ECUs 608 may communicate properties (e.g., status of the ECUs 608, sensor readings, control state, error and diagnostic codes, etc.) to and/or receive requests from each other. For example, the vehicle 100 may have seventy or more of the ECUs 608 that are positioned in various locations around the vehicle 100 and are communicatively coupled by the vehicle data bus 610.

In the illustrated example, the ECUs 608 include a camera module 626, a body control module 628, a speed control unit 630, and an autonomy unit 632. The camera module 626 controls one or more cameras of the vehicle 100 (e.g., the camera 108) to collect image(s) and/or video that are presented to occupant(s) of the vehicle 100 and/or utilized to facilitate performance of autonomous and/or semi-autonomous driving maneuvers of the vehicle 100. The body control module 628 controls one or more subsystems throughout the vehicle 100, such as power windows, power locks, an immobilizer system, power mirrors, etc. For example, the body control module 628 includes circuits that drive one or more of relays (e.g., to control wiper fluid, etc.), brushed direct current (DC) motors (e.g., to control power seats, power locks, power windows, wipers, etc.), stepper motors, LEDs, etc. The speed control unit 630 autonomously controls a speed at which the vehicle 100 travels. Further, the autonomy unit 632 controls performance of autonomous and/or semi-autonomous driving maneuvers of the vehicle 100 based upon, at least in part, image(s) and/or video captured by the camera 108 and/or data collected by the sensor 112 (e.g., the radar sensor 616, the lidar sensor 618, the ultrasonic sensor 620).

The vehicle data bus 610 communicatively couples the communication module 102, the GPS receiver 104, the camera 108, the on-board computing platform 602, the infotainment head unit 604, the sensors 606, and the ECUs 608. In some examples, the vehicle data bus 610 includes one or more data buses. The vehicle data bus 610 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
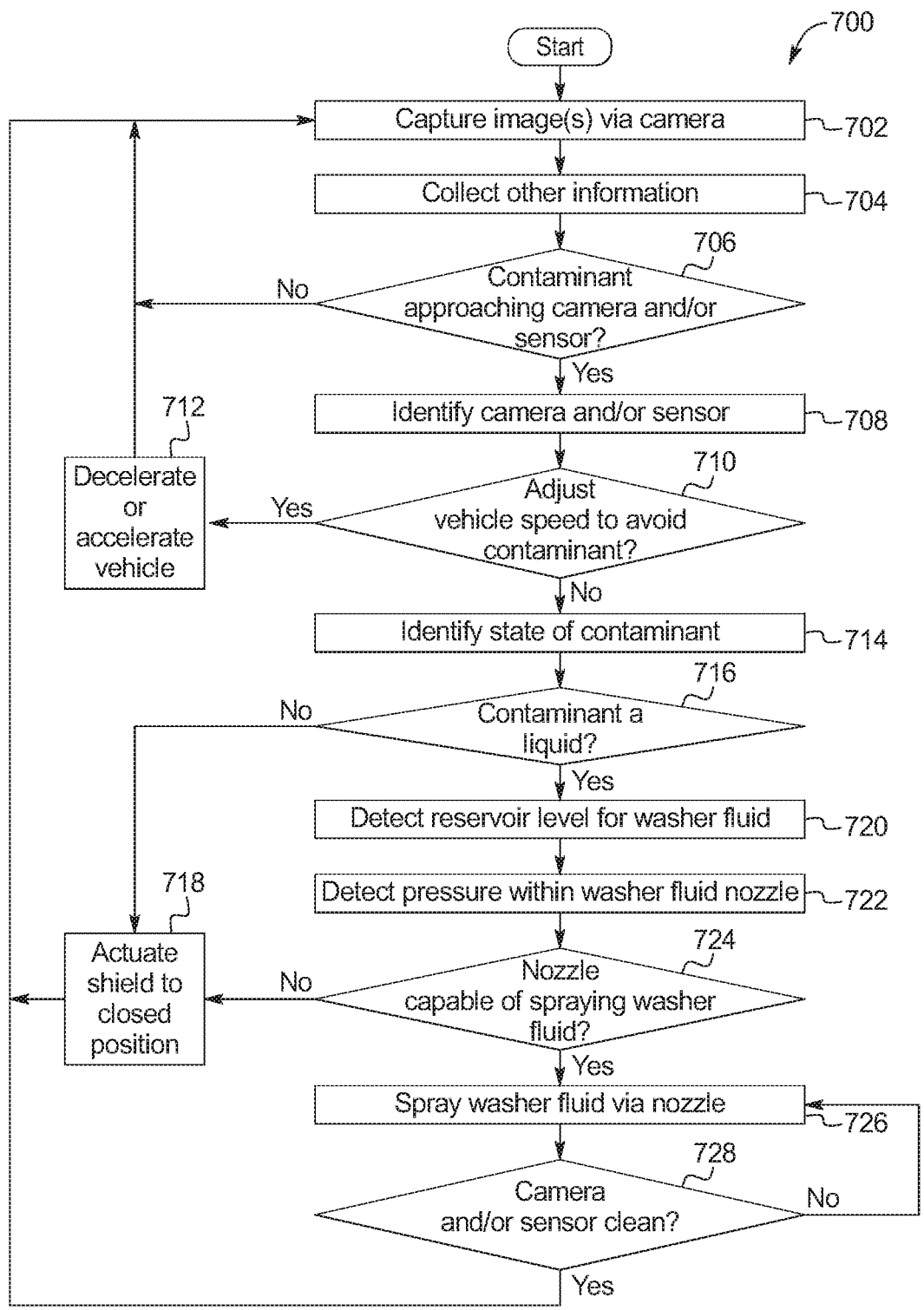
FIG. 7 is a flowchart for preventing contamination of cameras and sensors of the vehicle of FIG. 1 in accordance with the teachings herein.

FIG. 7 is a flowchart of an example method 700 to prevent contamination of an external camera and/or sensor of a vehicle in accordance with the teachings herein. The flowchart of FIG. 7 is representative of machine readable instructions that are stored in memory (such as the memory 614 of FIG. 6) and include one or more programs which, when executed by a processor (such as the processor 612 of FIG. 6), cause the vehicle 100 to implement the example contaminant controller 118 of FIGS. 1 and 6. While the example program is described with reference to the flowchart illustrated in FIG. 7, many other methods of implementing the example contaminant controller 118 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the camera 108 located along the exterior of the vehicle 100 captures image(s) and/or video of a surrounding area of the vehicle 100. Further, the contaminant controller 118 collects the image(s) and/or video captured by the camera 108. At block 704, the contaminant controller 118 collects other information for monitoring contaminant(s) around the vehicle 100. For example, the contaminant controller 118 collects mapping information from an onboard navigation system, vehicle location information from the GPS receiver 104 and/or other information from nearby vehicle(s) and/or communication module(s) via the communication module 102. For example, the onboard navigation system includes information that identifies where contaminants are located on roads. In some examples, the contaminant information included in the onboard navigation system is collected, at least in part, by sensor(s), camera(s), and/or other devices of the vehicle 100.

At block 706, the contaminant controller 118 determines whether a contaminant (e.g., the contaminant 210) is on a trajectory to approach the camera 108 and/or the sensor 112 based upon the collected image(s) and/or other information. In response to the contaminant controller 118 determining that a contaminant is not approaching the camera 108 or the sensor 112, the method 700 returns to block 702 to continue monitoring of the area surrounding the vehicle 100. Otherwise, in response to the contaminant controller 118 determining that a contaminant is approaching the camera 108 and/or the sensor 112, the method 700 proceeds to block 708 at which the contaminant controller 118 identifies whether the contaminant 210 is on a trajectory to contaminate the lens 202 of the camera 108 and/or the sensor 112.

At block 710, the contaminant controller 118 determines whether to adjust a speed of the vehicle 100 to avoid the contaminant 210 from contacting the lens 202 of the camera 108 and/or the sensor 112. In response to the contaminant controller 118 determining to adjust the speed of the vehicle 100, the method 700 proceeds to block 712 at which the contaminant controller 118 sends a signal to the speed control unit 630 and/or the autonomy unit 632 of the vehicle 100 to cause the vehicle 100 to autonomously accelerate and/or decelerate to prevent the contaminant 210 from contaminating the lens 202 and/or the sensor 112. Otherwise, in response to the contaminant controller 118 determining not to adjust the speed of the vehicle 100, the method 700 proceeds to block 714 at which the contaminant controller 118 identifies the state of the contaminant 210 based upon the image(s) and/or video captured by the camera 108.

At block 716, the contaminant controller 118 determines whether the state of the contaminant 210 is a liquid. In response to the contaminant controller 118 determining that the state of the contaminant 210 is not a liquid (i.e., the state of the contaminant 210 is a solid), the method 700 proceeds to block 718 at which the contaminant controller 118 causes the shield 402 to actuates to a closed position. For example, if the contaminant controller 118 identifies at block 708 that the contaminant 210 is approaching the lens 202 of the camera 108, the shield 402 (e.g., the first shield) actuates to the closed position to cover the lens 202 to prevent the contaminant 210 from contacting and, thus, contaminating the lens 202. If the contaminant controller 118 identifies at block 708 that the contaminant 210 is approaching the sensor 112, the shield 402 (e.g., the second shield) actuates to the closed position to cover the sensor 112 to prevent the contaminant 210 from contacting and, thus, contaminating the sensor 112.

Otherwise, in response to the contaminant controller 118 determining at block 714 that the state of the contaminant 210 is a liquid, the method 700 proceeds to block 720 at which the reservoir sensor 622 detects a reservoir level of the washer fluid 206 within the reservoir 116. Further, at block 722, the pressure sensor 624 detects a pressure within the nozzle 204. At block 724, the contaminant controller 118 determines whether the nozzle 204 is able to spray the washer fluid 206 to prevent the contaminant 210 from contaminating the lens 202 of the camera 108 and/or the sensor 112. In response to the contaminant controller 118 determining that the nozzle 204 is unable to spray the washer fluid 206 to prevent contamination, the method 700 proceeds to block 718 at which the contaminant controller 118 causes the shield 402 to actuate to the closed position. Otherwise, in response to the contaminant controller 118 determining that the nozzle 204 is able to spray the washer fluid 206 to prevent contamination, the method 700 proceeds to block 726.

At block 726, the contaminant controller 118 causes the nozzle 204 to spray the washer fluid 206. For example, if the contaminant controller 118 identifies at block 708 that the contaminant 210 is approaching the lens 202 of the camera 108, the nozzle 204 (e.g., the first nozzle) sprays the washer fluid 206 in front of the lens 202 to intercept the contaminant 210 from contacting the lens 202 and/or onto the lens 202 before the contaminant 210 contacts the lens 202 to deter the contaminant 210 from adhering to the lens 202. Similarly, if the contaminant controller 118 identifies at block 708 that the contaminant 210 is approaching the sensor 112, the nozzle 204 (e.g., the second nozzle) sprays the washer fluid 206 in front of the sensor 112 to intercept the contaminant 210 from contacting the sensor 112 and/or onto the sensor 112 before the contaminant 210 contacts the sensor 112 to deter the contaminant 210 from adhering to the sensor 112.

At block 728, the contaminant controller 118 determines whether the lens 202 of the camera 108 and/or the sensor 112 is clean after the nozzle 204 has sprayed the washer fluid 206. For example, the contaminant controller 118 determines whether the lens 202 is clean based upon image(s) and/or video that are captured by the camera 108 after the nozzle 204 has sprayed the washer fluid 206. The contaminant controller 118 determines whether the sensor 112 is clean based upon data captured by the sensor 112 after the nozzle 204 has sprayed the washer fluid 206. In response to the contaminant controller 118 determining that the lens 202 and/or the sensor 112 is not clean, the method 700 returns to block 726 to subsequently spray the washer fluid 206 onto the lens 202 and/or sensor 112 for further cleaning. Otherwise, in response to the contaminant controller 118 determining that the lens 202 and/or the sensor 112 is clean, the method 700 returns to block 702 to continue monitoring of the area surrounding the vehicle 100.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an exterior;
    a camera along the exterior and including a lens;
    a controller to:
        determine, based upon images captured by the camera, whether a contaminant is approaching the lens; and
        identify a contaminant state upon determining the contaminant is approaching the lens;
    a nozzle to spray washer fluid to prevent contamination of the lens responsive to the controller identifying that the contaminant is a liquid; and
    a shield that actuates between an open position and a closed position, the shield is housed adjacent to the camera at the open position, the shield covers the lens to prevent the contaminant from contacting the lens at the closed position, the shield is transparent to enable the camera to capture the images when the shield is in the closed position.

2. The vehicle of claim 1, wherein the controller determines whether the contaminant is approaching the lens by identifying a percentage for each of the images that is occupied by the contaminant over time.

3. The vehicle of claim 1, further including a communication module for vehicle-to-vehicle communication, wherein the controller determines whether the contaminant is approaching the lens further based upon information collected via the vehicle-to-vehicle communication.

4. The vehicle of claim 1, wherein the nozzle sprays the washer fluid in front of the lens of the camera to intercept the contaminant from contacting the lens.

5. The vehicle of claim 1, wherein the nozzle sprays the washer fluid onto the lens of the camera to deter the contaminant from adhering to the lens.

6. The vehicle of claim 1, wherein:
    the controller detects, upon the nozzle spraying the washer fluid, whether the contaminant at least partially covers the lens; and
    the nozzle again sprays the washer fluid onto the lens responsive to the controller detecting that the contaminant at least partially covers the lens.

7. The vehicle of claim 1, wherein, upon determining that the contaminant is approaching the lens, the controller sends a deceleration signal to at least one of a speed control module and an autonomy unit to prevent the contaminant from contacting the lens.

8. The vehicle of claim 1, wherein the shield actuates to the closed position responsive to the controller identifying that the contaminant includes a solid.

9. The vehicle of claim 1, wherein the shield actuates to the closed position responsive to the controller determining that the nozzle is unable to spray the washer fluid to prevent contamination of the lens.

10. The vehicle of claim 9, further including a reservoir sensor for monitoring a level of the washer fluid within a reservoir, wherein the controller determines the nozzle is unable to spray the washer fluid responsive to the reservoir sensor detecting the level of the washer fluid is below a predetermined threshold.

11. The vehicle of claim 9, further including a pressure sensor for monitoring a pressure of the nozzle, wherein the controller determines the nozzle is unable to spray the washer fluid responsive to the pressure sensor detecting the pressure of the nozzle is below a predetermined threshold.

12. The vehicle of claim 1, further including a sensor adjacent to the camera, wherein the controller is to determine whether the contaminant is approaching the sensor based upon the images captured by the camera and identify the contaminant state upon determining the contaminant is approaching the sensor.

13. The vehicle of claim 12, further including a second nozzle that sprays the washer fluid to prevent contamination of the sensor responsive to the controller identifying that the contaminant is a liquid.

14. The vehicle of claim 12, wherein the sensor is at least one of a radar sensor, a lidar sensor, and an ultrasonic sensor.

15. A vehicle comprising:
    an exterior;
    a camera along the exterior and including a lens;
    a controller to:
        determine, based upon images captured by the camera, whether a contaminant is approaching the lens; and
        identify a contaminant state upon determining the contaminant is approaching the lens; and
    a nozzle to spray washer fluid to prevent contamination of the lens responsive to the controller identifying that the contaminant is a liquid;
    a sensor adjacent to the camera, wherein the controller is to determine whether the contaminant is approaching the sensor based upon the images captured by the camera and identify the contaminant state upon determining the contaminant is approaching the sensor;
    a second nozzle that sprays the washer fluid to prevent contamination of the sensor responsive to the controller identifying that the contaminant is a liquid; and
    a shield that actuates to a closed position responsive to the controller at least one of identifying that the contaminant approaching the sensor includes a solid and determining that the second nozzle is unable to spray the washer fluid to prevent contamination of the sensor.

16. A method comprising:
    capturing images via a camera positioned along an exterior of a vehicle;

determining, via a processor, whether a contaminant is approaching a sensor adjacent to the camera based upon the images captured by the camera; and responsive to determining the contaminant is approaching the sensor, at least one of spraying fluid via a nozzle and actuating a shield to a closed position to cover the sensor to prevent contamination of the sensor.

17. The method of claim 16, comprising:

determining, via the processor, whether the contaminant is approaching a lens of the camera based upon the images;

identifying, via the processor, a contaminant state upon determining the contaminant is approaching the lens; and spraying the fluid, via a second nozzle, to prevent contamination of the lens upon identifying the contaminant is a liquid.

18. The method of claim 17, further including actuating a second shield to a closed position to cover the lens upon at least one of identifying that the contaminant includes a solid and determining that the second nozzle is unable to spray the fluid.

19. The method of claim 17, further including autonomously decelerating the vehicle upon determining the contaminant is approaching the lens.

\* \* \* \* \*